(12) United States Patent
Tanaka

(10) Patent No.: US 7,035,956 B2
(45) Date of Patent: Apr. 25, 2006

(54) TRANSMISSION CONTROL CIRCUIT, RECEPTION CONTROL CIRCUIT, COMMUNICATIONS CONTROL CIRCUIT, AND COMMUNICATIONS CONTROL UNIT

(75) Inventor: Yuji Tanaka, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 399 days.

(21) Appl. No.: 10/374,044

(22) Filed: Feb. 27, 2003

(65) Prior Publication Data

US 2003/0167368 A1 Sep. 4, 2003

(30) Foreign Application Priority Data

Mar. 1, 2002 (JP) .............................. 2002-055460

(51) Int. Cl.
*G06F 13/36* (2006.01)

(52) U.S. Cl. ........................... 710/306; 710/33; 710/34; 710/35

(58) Field of Classification Search ............. 710/33–35
See application file for complete search history.

(56) References Cited

U.S. PATENT DOCUMENTS 5,561,816 A * 10/1996 Mitsuhira et al. ............. 710/22
5,655,151 A * 8/1997 Bowes et al. .................. 710/22
5,983,289 A * 11/1999 Ishikawa et al. .............. 710/35
6,111,592 A * 8/2000 Yagi ........................... 345/537

FOREIGN PATENT DOCUMENTS

| JP | 62-60044 | 3/1987 |
| JP | 2-32650 | 2/1990 |
| JP | 2-298140 | 12/1990 |

* cited by examiner

Primary Examiner—Rehana Perveen
Assistant Examiner—Nimesh Patel
(74) Attorney, Agent, or Firm—Birch, Stewart, Kolasch & Birch, LLP

(57) ABSTRACT

A communications control circuit includes: a common work RAM storing communications data; an address register; a data-set-count register; an information register; an address counter; a data set counter; a RAM control circuit reading transmission data from a common memory in response to a transmission data request, writing reception data to the common memory in response to a reception data request, and generating a counter clock; a transmission circuit; a reception circuit; and a communications controller setting the address counter to an address upon transmission/reception and a counter to a number of sets of data, and if transmission/reception has been successful, writing the address back to the address register and the number of sets of data back to the register.

16 Claims, 12 Drawing Sheets

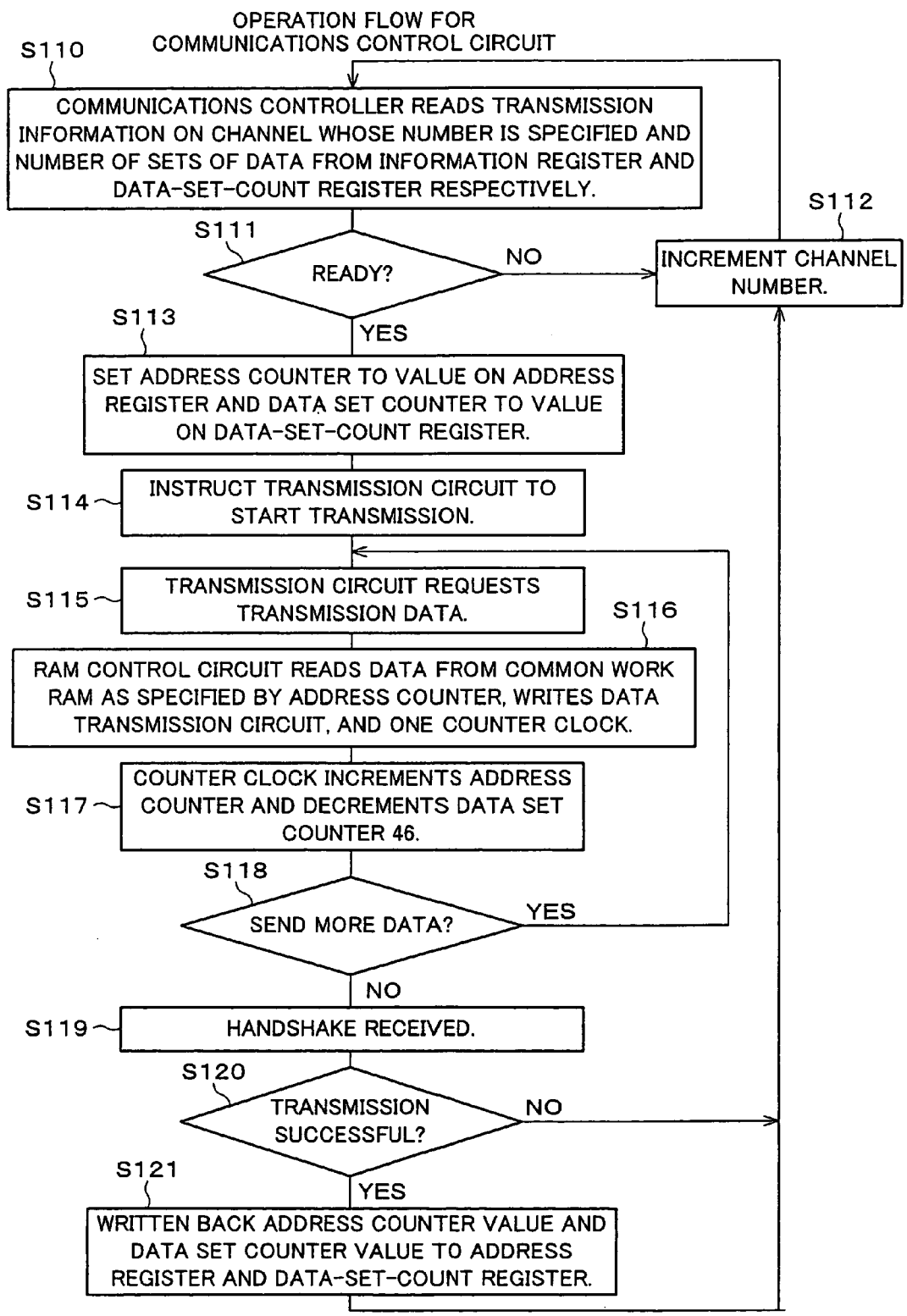

OPERATION FLOW FOR COMMUNICATIONS CONTROL CIRCUIT

TRANSMISSION CONTROL CIRCUIT, RECEPTION CONTROL CIRCUIT, COMMUNICATIONS CONTROL CIRCUIT, AND COMMUNICATIONS CONTROL UNIT

FIELD OF THE INVENTION

The present invention relates to a transmission control circuit, a reception control circuit, and a communications control circuit which constitute a communications control unit for exchanging data with another device, in particular, to a transmission control circuit, a reception control circuit, a communications control circuit, and a communications control unit which are simple in structure and capable of exchanging a large number of different sets of data with respective devices by time division under simple control of a CPU.

More specifically, the present invention relates to a transmission control circuit, a reception control circuit, a communications control circuit, and a communications control unit which are simple in structure and capable of communicating with as many as 127 devices each having 16 end points, or communications channels, (that makes up 127×16=2032 communications channels in total) under simple control of a CPU, as in a USB (Universal Serial Bus) host circuit.

BACKGROUND OF THE INVENTION

Electronic devices have conventionally adopted various kinds of communications means to communicate with various kinds of electronic devices. In the era when the communications means worked at low speed, every electronic device had its own communications circuit, and a communications circuit was accessible only to one electronic device; communication was carried out on a one-to-one basis.

Recent years have seen dramatic improvements in operating speed of those circuits, enabling many electronic devices to access a single communications circuit.

FIG. 7 shows such an example, where USB (Universal Serial Bus) can connect up to 127 devices to a single host. Each device is equipped with up to 16 end points. This means that the host is required have a capability to communicate with as many as 127×16=2032 end points.

Now, referring to FIG. 8, conventional communications control units (host circuits) will be described. A communications control unit includes a CPU 101, a ROM 102, various I/O devices 103, and a communications control circuit 105. The CPU 101, ROM 102, and I/O devices 103 are connected to the communications control circuit 105 via a CPU address bus and a CPU data bus.

The communications control circuit 105 includes a communications controller 50, channel "0" FIFO 510 to channel "n" FIFO 51n provided for respective channels, an information register 54, a reception circuit 55, a transmission circuit 56, a channel selector 57, and a FIFO control circuit 58.

The channel FIFOs 510 to 51n each include RAM, a read counter 520 to 52n, and a write counter 530 to 53n.

The CPU 101 controls the I/O devices 103 and the communications control circuit 105 according to a program stored in the ROM 102. The I/O devices 103 may be, for example, a keyboard, a display, a data memory, a motor, and a sensor.

The following will describe procedures to transmit data from channel "0" to the communications bus using the communications control circuit 105 sequentially.

(1) The CPU 101 writes communications data from the CPU data bus to the channel "0" FIFO 510.

(2) The write counter 530 inside the channel "0" FIFO 510 is incremented each time a set of communications data is written to the FIFO 510. When the write counter 530 reaches the same value as the read counter 520, the FIFO 510 is full and stops writing. The read and write counters 520 to 52n, 530 to 53n in the FIFOs 510 to 51n are all endless counters. If they are rated for 64 bites, for example, they change from 0 to 63 and then start all over again from 0. The counting may start from any given value, but is required to end in such a manner that the values of the read counters 520 to 52n are equal to those of the write counter 530 to 53n.

(3) The CPU 101 writes communications speed, type, validity, and other information on the channel "0" to the information register 54.

(4) The communications controller 50 checks the value in the information register 54 and the conditions of the channel "0" FIFO 510 to the channel "n" FIFO 51n, while incrementing the channel number from 0 to n sequentially, so as to see whether a preparation has been done for a communication.

(5) Upon determination that the channel "0" is ready, the communications controller 50 instructs the transmission circuit 56 to start transmission.

(6) When the transmission circuit 56 sends the FIFO control circuit 58 a transmission data request, the FIFO control circuit 58 reads data from the channel "0" FIFO 510 and sends it to the transmission circuit 56 via the channel selector 57. The read counter 520 is incremented each time a set of data is read out from the channel "0" FIFO 510. When the read counter 520 reaches the same value as the write counter 530, the FIFO 510 is empty.

(7) The transmission circuit 56 sends the data to the communications bus.

(8) Steps (6) and (7) are repeated until there is no more data to send (until the FIFO 510 is empty).

(9) When the FIFO is empty, the operation returns to (1), whereupon a process for a next channel is carried out.

The following will describe procedures to receive data from a communications bus to the channel "1" using the communications control circuit 105.

(1) The CPU 101 writes communications speed, type, and other information on the channel "1" to the information register 54.

(2) The reception circuit 55 receives data to be transmitted to the channel "1" from the communications bus.

(3) The communications controller 50 checks the received data for the channel to which the data is directed and sets the channel number to 1.

(4) When the reception circuit 55 sends the FIFO control circuit 58 a reception data request, the FIFO control circuit 58 sends a writing signal to the channel "1" FIFO 511 and writes the reception data to the channel "1" FIFO 511. The write counter 531 is incremented each time a set of data is written to the channel "1" FIFO 511.

(5) When all data is received (for example, the FIFO is full, a predetermined number of sets of data is received, or a reception termination signal is received), the CPU 101 reads data from the channel "1" FIFO 511 and transmits it to the CPU data bus. The read counter 521 is incremented each time a set of data is read. When the read counter 521 reaches the same value as the write counter 531, the FIFO is empty.

(6) When the FIFO is empty, the operation returns to (1), whereupon a process for a next channel is carried out.

The communications control circuit detailed in the foregoing requires as many FIFOs, hence read counters, write counters, and FIFO-use memories (RAM), as communications channels. The capacity of the FIFO memory (RAM) needs to be greater than or equal to a maximum communications data packet size.

For example, a USB connection, handling 2032 channels and a maximum packet size of 1023 bites, requires a large-scale circuit and large-capacity memory: 2032 read counters, 2032 write counters, and 2032 FIFO memories (RAM) each storing 1023 bites (which adds to 1023 bites× 2032=2078736 bites).

If there has occurred an error during a transmission, the CPU 101 needs to once again write the same data to the FIFOs and instruct the transmission circuit 56 to start transmission; if there has occurred an error during a reception, the CPU 101 needs to discard the data in the FIFOs and once again receive the same data. If these restarting processes are to be carried out by the communications control circuit 105, instead of the CPU 101, every FIFO needs to be equipped with a circuit which records the communications-starting values of the read and write counters in the FIFO and on the occurrence of an error during communications, writes the recorded values back to the read and write counters. The provision of the circuit further adds to the complexity of the circuit.

The easiest way to reduce circuit complexity is to adopt the configuration shown in FIG. 9 (conventional example 2). The communications control unit arranged as in the figure includes a CPU 201, a ROM 202, various I/O devices 203, a work RAM 61, a reception circuit 62, a transmission circuit 63, and a DMA controller 64 which are connected via a CPU address bus and a CPU data bus.

The work RAM 61 stores communications data, addresses, the numbers of sets of data, and information. The DMA controller 64 has a DMA transfer request controller 640, an address counter 641, and a data set counter 642.

In this arrangement, the CPU 201 stores all of data, an address, the number of sets of data, and information for each channel in the work RAM 61 and transfers data from the work RAM 61 to the reception circuit 62 and the transmission circuit 63 and vice versa via the CPU data bus using the DMA controller 64.

The CPU 201 controls the I/O devices 203, the work RAM 61, the reception circuit 62, the transmission circuit 63, and the DMA controller 64 according to a program stored in the ROM 2.

Data is transmitted by the following procedures.

(1) The CPU 201 writes data to the work RAM 61.

(2) The CPU 201 checks the number of sets of data in the work RAM 61, communications speed, type, validity, and other information to determine whether a preparation has been done for a transmission.

(3) Upon determination that a preparation has been done for a transmission, the CPU 201 sets the address counter 641 and the data set counter 642 in the DMA controller 64 to the address and number of sets of data in the work RAM 61 storing the data, and instructs the transmission circuit 63 to start transmission.

(4) When the transmission circuit 63 sends the DMA transfer request controller 640 in the DMA controller 64 a transmission data request, the DMA controller 64 sends that specific address to the CPU address bus, reads corresponding data from the work RAM 61, and transfers the data to the transmission circuit 63 via the CPU data bus. The DMA controller 64 increments the address counter 641 and decrements the data set counter 642 each time a set of data is transferred.

(5) The transmission circuit 63 sends the data readout from the work RAM 61 to the communications bus.

(6) Steps (4) and (5) are repeated until there is no more data (until the data set counter 642 shows a 0 value).

(7) When there is no more data, the operation returns to (1), whereupon a process for a next channel is carried out.

Data is received by the following procedures.

(1) The CPU 201 writes, for example, the address and number of sets of data in, and information on, the work RAM 61 storing reception data to the work RAM 61.

(2) The reception circuit 62 receives data addressed to the channel "1" from the communications bus.

(3) The CPU 201 checks a channel for the received data, and also checks information on, and the number of sets of data for, the channel "1". Upon determination that a preparation has been done for a reception, the CPU 201 sets the address counter 641 and the data counter 642 in the DMA controller 64 to an address and the number of sets of data.

(4) When the reception circuit 62 sends the DMA transfer request controller 640 in the DMA controller 64 a reception data request, the DMA controller 64 sends that specific address to the CPU address bus, reads data from the reception circuit 62, and transfers the data to the work RAM 61 via the CPU data bus. The DMA controller 64 increments the address counter 641 and decrements the data set counter 642 each time a set of data is transferred.

(5) When all data is received (for example, the data set counter 642 shows a 0 value, a predetermined number of sets of data is received, or a reception termination signal is received), the operation is ended.

(6) When all data is received, the operation returns to (1), whereupon a process for a next channel is carried out.

In this method, all data to be transmitted and received is stored in the work RAM 61, it suffices to set aside part of the work RAM 61 for channels through which communications is actually being carried out. Additionally, the address counter 641 and the data set counter 642 in the DMA controller 64 are commonly used for all the channels. These factors greatly reduce circuit complexity.

The CPU 201, however, needs to write values to the address counter 641 and the data set counter 642 in the DMA controller 64 for each communication, as well as to instruct the transmission circuit 63 for transmission and instantly react to a request from the reception circuit 62. To this end, the CPU 201 needs to have very high performance to carry out high speed communications If there has occurred an error during a transmission, the CPU 201 needs to write values to the address counter 641 and the data set counter 642 in the DMA controller 64 and instruct the transmission circuit 63 for transmission, so as to transmit the same data again; if there has occurred an error during a reception, the CPU 201 needs to write values to the address counter 641 and the data set counter 642 in the DMA controller 64 and wait for incoming data, so as to receive the same data. This demonstrates that the CPU 201 needs to operate on the occurrence of an error too.

In addition, during a data transfer, the DMA controller 64 uses the CPU address bus and the CPU data bus, inhibiting the CPU 201 from functioning. This results in poor control over the I/O devices 203.

Japanese Unexamined Patent Application 2-32650/1990 (Tokukaihei 2-32650, published on Feb. 2, 1990) discloses an approach to these problems, using common memory and a CPU, other than the CPU 201, which performs communications, as in conventional example 3 in FIG. 10 of the document.

In this example, the communications control unit includes a CPU 301, a ROM 302, various I/O devices 303, a common work RAM 71, a common memory 72, a reception circuit 73, a transmission circuit 74, a DMA controller 75, a CPU 70, and a ROM 76.

The CPU 301, ROM 302, I/O devices 303, common work RAM 71, and common memory 72 are connected to a CPU address bus and a CPU data bus. The CPU 70, common work RAM 71, common memory 72, reception circuit 73, transmission circuit 74, DMA controller 75, and ROM 76 are connected to a CPU 70 address bus and a CPU 70 data bus.

The CPU 301 controls the I/O devices 303, common work RAM 71, and common memory 72 according to a program stored in the ROM 302. The CPU 70 controls the common work RAM 71, common memory 72, reception circuit 73, transmission circuit 74, and DMA controller 75 according to a program stored in the ROM 76.

Data is transmitted by the following procedures.

(1) The CPU 301 writes data to the common work RAM 71 and also writes, for example, the address of the data, the number of the sets of the data, and other information to the common memory 72.

(2) The CPU 70 checks the number of the sets of the data, as well as communications speed, type, validity, other information, etc. in the common memory 72 to determine whether a preparation has been done for a transmission.

(3) Upon determination that a preparation has been done for a transmission, the CPU 70 sets the address counter 751 and the data set counter 752 in the DMA controller 75 to the address and number of sets of the data in the common work RAM 71 storing the data, and instructs the transmission circuit 74 to start transmission.

(4) When the transmission circuit 74 sends the DMA transfer request controller 750 in the DMA controller 75 a communications data request, the DMA controller 75 sends that specific address to the CPU 70 address bus, reads corresponding data from the common work RAM 71, and transfers the data to the transmission circuit 74 via the CPU 70 data bus. The DMA controller 75 increments the address counter 751 and decrements the data set counter 742 each time a set of data is transferred.

(5) The transmission circuit 74 sends data to the communications bus.

(6) Steps (4) and (5) are repeated until there is no more data (until the data set counter 752 shows a 0 value).

(7) When there is no more data, the operation returns to (1), whereupon a process for a next channel is carried out.

Data is received by the following procedures.

(1) The CPU 301 writes, for example, the address and number of sets of, and information on, the data in the common work RAM 71 storing reception data to the common memory 72.

(2) The reception circuit 73 receives data addressed to the channel "1" from the communications bus.

(3) The CPU 70 checks a channel for the received data, and also information on, and the number of sets of data for, the channel "1". Upon determination that a preparation has been done for a reception, the CPU 70 sets the address counter 751 and the data set counter 752 in the DMA controller 75 to an address and the number of sets of data.

(4) When the reception circuit 73 sends the DMA transfer request controller 750 in the DMA controller 75 a reception data request, the DMA controller 75 sends that specific address to the CPU 70 address bus, reads data from the reception circuit 73, and transfers the data to the common work RAM 71 via the CPU 70 data bus. The DMA controller 75 increments the address counter 751 and decrements the data set counter 752 each time a set of data is transferred.

(5) When all data is received (for example, the data set counter shows a 0 value, a predetermined number of sets of data is received, or reception termination signal is received), the operation is ended.

(6) When all data is received, the operation returns to (1), whereupon a process for a next channel is carried out.

The approach assigns communications control, data transfer, etc. to the CPU 70, thereby dedicating the CPU 301 to the control of the I/O devices 303.

The CPU 70, however, needs to write values to the address counter 751 and the data set counter 752 in the DMA controller 75 for each communication, as well as to instruct the transmission circuit 74 for transmission and instantly react to a request from the reception circuit 73. To this end, the CPU 70 needs to have very high performance to carry out high speed communications.

If there has occurred an error during a transmission, the CPU 70 needs to write values to the address counter 751 and the data set counter 752 in the DMA controller 75 and instruct the transmission circuit 74 for transmission, so as to transmit the same data again; if there has occurred an error during a reception, the CPU 70 needs to write values to address counter 751 and the data set counter 752 in the DMA controller 75 and wait for incoming data, so as to receive the same data. This demonstrates that the approach makes no difference at all regarding the fact that the CPU 70 needs to operate on the occurrence of an error too.

In addition, the approach generally requires complex CPUs and program-storing ROM. Circuit complexity is considerable high when compared to FIG. 9.

For example, Japanese Unexamined Patent Application 62-60044/1987 (Tokukaisho 62-60044, published on Mar. 16, 1987) is an attempt to achieve high speed communications through use of more CPUs, one for transmission control and another for reception control, but is accompanied by the problem of increased circuit complexity.

SUMMARY OF THE INVENTION

An objective of the present invention is to offer a transmission control circuit, a reception control circuit, a communications control circuit, and a communications control unit which are capable of, on the occurrence of a communications error in high speed communications through a very large number of channels, performing communications once again with least possible circuit complexity without adding to the operating load of the CPU.

In order to achieve the objective, a transmission control circuit in accordance with the present invention is a transmission control circuit connected to a CPU and a communications bus and includes:

transmission data memory means for storing transmission data in segments in accordance with a command from the CPU;

address information memory means for storing at least address information on the transmission data;

transmission means for transmitting the transmission data to the communications bus;

address setting means for sequentially setting address data for the transmission data in accordance with the address information; and communications control means for carrying out such a control that the transmission data is transmitted in segments to the communications bus through the transmission means in accordance with the address data, and that if the transmission data has been successfully transmitted, the address data is updated by the address setting means, and if the transmission data has not been successfully transmitted, the address data remains unchanged.

In order to achieve the objective, a reception control circuit in accordance with the present invention is a reception control circuit connected to a CPU and a communications bus and includes:

reception data memory means for storing reception data;

reception means for sequentially transferring the reception data received from the communications bus to store the reception data in the reception data memory means;

address information memory means for storing at least address information on the reception data in accordance with a command from the CPU;

address setting means for sequentially setting address data according to which the reception data is stored in the reception data memory means, in accordance with the address information; and communications control means for carrying out such a control that the reception data is sequentially transferred through the reception means and stored at an address in the reception data memory means according to the address data, and that if the reception data has been successfully received and transferred, the address data is updated by the address setting means, and if the reception data has not been successfully received or transferred, the address data remains unchanged.

In order to achieve the objective, a communications control circuit in accordance with the present invention is a communications control circuit connected to a CPU and a communications bus and includes:

communications data memory means for, in transmission, storing transmission data in segments in accordance with a command from the CPU, and in reception, storing reception data;

transmission means for, in transmission, transmitting the transmission data to the communications bus;

reception means for, in reception, sequentially transferring the reception data received from the communications bus so that the reception data is stored in the communications data memory means;

address information memory means for, in transmission, storing at least address information on the transmission data, and in reception, storing at least address information on the reception data in accordance with a command from the CPU;

address setting means for, in transmission, sequentially setting address data for the transmission data in accordance with the address information; and in reception, sequentially setting address data according to which the reception data is stored in the communications data memory means, in accordance with the address information; and communications control means for carrying out such a control that in transmission, the transmission data is transmitted in segments to the communications bus through the transmission means in accordance with the address data, and if the transmission data has been successfully transmitted, the address data is updated by the address setting means, and if the transmission data has not been successfully transmit-ted, the address data remains unchanged; and that in reception, the reception data is sequentially transferred through the reception means and stored at an address in the communications data memory means according to the address data, and if the reception data has been successfully received and transferred, the address data is updated by the address setting means, and if the reception data has not been successfully received or transferred, the address data remains unchanged.

According to the foregoing invention, it is only once that the CPU has to store the communications data in the transmission data memory means, the reception data memory means, and the communications data memory means and store the address information as to the transmission data memory means, the reception data memory means, and the communications data memory means in the address information memory means. Therefore, the CPU is dedicated to I/O device control.

Further, when the communications data is to be input to/output from the transmission data memory means, the reception data memory means, and the communications data memory means, the address setting means sets each set of address data, and the communications control means controls so that the address data in the address setting means is updated upon successful sequential transmission/reception of the communications data and that the address data in the address setting means is not updated upon failed sequential transmission/reception of the communications data based on the address data.

Therefore, when there has occurred a communications error during communications through the communications bus, subsequent part of the communications data can be once again input to/output from the transmission data memory means, the reception data memory means, and the communications data memory means in accordance with the address data in the address setting means at the time of the transmission/reception failure.

Thus, a transmission control circuit, a reception control circuit, and a communications control circuit for use in high speed communications involving many a channel can be offered which are capable of, when there has occurred a communications error, carrying out communications once again without increasing the workload of the CPU with least possible circuit complexity.

Further, another communications control unit in accordance with the present invention includes, in the communications control circuit, a CPU, a ROM for storing a program, and an I/O device.

Thus, a communications control unit for use in high speed communications involving many a channel can be offered which are capable of, when there has occurred a communications error, carrying out communications once again without increasing the workload of the CPU with least possible circuit complexity.

For a fuller understanding of the nature and advantages of the invention, reference should be made to the ensuing detailed description taken in conjunction with the accompanying drawings.

DETAILED DESCRIPTION OF THE PRESENT INVENTION

The following will describe an embodiment in accordance with the present invention in reference to FIGS. 1–6.

Figure 1:
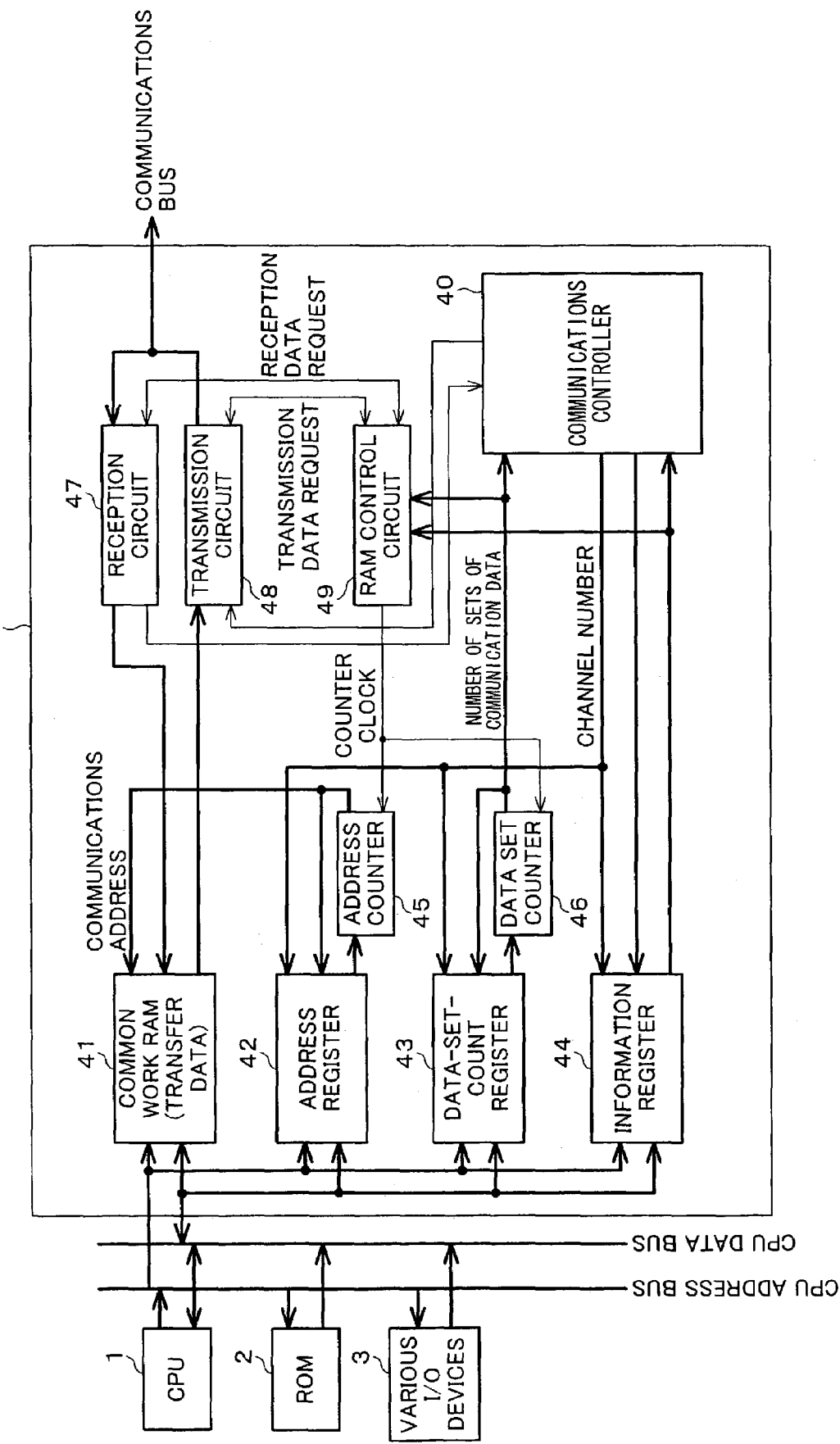
FIG. 1 is a block diagram illustrating an arrangement of an embodiment of a communications control unit in accordance with the present invention.

Referring to FIG. 1, an arrangement of a communications control unit adopting a communications (transmission/reception) control circuit in accordance with the present invention will be described.

The communications control unit includes a CPU 1, a ROM 2, various I/O devices 3, and a communications control circuit 4. The CPU 1, ROM 2, I/O devices 3, and communications control circuit 4 are connected with one another via a CPU address bus and a CPU data bus. The communications control circuit 4 is connected to a communications bus.

The CPU 1 controls the I/O devices 3, common work RAM 41, address register 42, data-set-count register 43, and information register 44 according to a program stored in the ROM 2.

The ROM 2 stores programs according to which the I/O devices 3, common work RAM 41, address register 42, data-set-count register 43, and information register 44 are controlled.

The I/O devices 3 are various communications devices between communications control units involved in the communications.

The communications control circuit 4 is a circuit which controls communications with communications control units involved in the communications through a communications bus, and in this example, adopted so as to carry out communications between a maximum of 2032 channels by time division.

The communications control circuit 4 includes a communications controller 40, common work RAM 41, address register 42, data-set-count register 43, information register 44, address counter 45, data set counter 46, reception circuit 47, transmission circuit 48, and RAM control circuit 49.

The CPU address bus is for exchanging addresses and information on the addresses between the CPU 1, ROM 2, and I/O devices 3 on one hand and the common work RAM 41, address register 42, data-set-count register 43, and information register 44 in the communications control circuit 4 on the other.

The CPU data bus is for exchanging communications data and other kinds of information between the CPU 1, ROM 2, and I/O devices 3 on one hand and the common work RAM 41, address register 42, data-set-count register 43, and information register 44 in the communications control circuit 4 on the other.

The communications controller 40 always monitors the data-set-count register 43, information register 44, and reception circuit 47 in the communications control circuit 4; if these registers and circuit are ready for transmission or receive any data, for example, the communications controller 40 controls the common work RAM 41, address register 42, data-set-count register 43, information register 44, address counter 45, data set counter 46, reception circuit 47, transmission circuit 48, and RAM control circuit 49 to carry out communications.

Being a common RAM accessible to both the CPU bus side and the communications bus (communications control circuit) side, the common work RAM 41 stores communications data (transfer data) to be transmitted/received between the CPU bus and the communications bus.

The address register 42 is accessible to both the CPU bus side and the communications bus side, where the address of communications data stored in the common work RAM 41 is held.

The data-set-count register 43 is accessible to both the CPU bus side and the communications bus side, where the number of sets of communications data to be stored in the common work RAM 41 is held.

The information register 44 is accessible to both the CPU bus side and the communications bus side, where various kinds of information on communications data, such as communications speed, type, and validity, stored in the common work RAM 41 is held.

The address counter 45 is set to an address value, read from the address register 42, representing a location in the common work RAM 41 where communications data with a channel number provided by the communications controller 40 is to be stored, and incremented by a counter clock supplied from the RAM control circuit 49.

The data set counter 46 is set to a value, read from the data-set-count register 43, representing the number of sets of communications data with a channel number provided by the communications controller 40, and is decremented by a counter clock supplied from the RAM control circuit 49.

The reception circuit 47 receives communications data from the communications bus, whereupon it notifies the communications controller 40 of the reception and transfers the received communications data to the common work RAM 41 in accordance with a reception data transfer request from the RAM control circuit 49.

The transmission circuit 48 sends a transmission data transfer request to the RAM control circuit 49 in accordance with a command from the communications controller 40 and transmits communications data transferred from the common work RAM 41 to the communications bus.

The RAM control circuit 49, when either the transfer of communications data (reception data) from the reception circuit 47 to the common work RAM 41 or the transfer of communications data (transmission data) from the common work RAM 41 to the transmission circuit 48 is successful, generates a counter clock and sends it to the address counter 45 and the data set counter 46.

In the present embodiment, if either the transmission or reception of communications data is successful, the value on the address counter 45, incremented by the counter clock, is written back to the address register 42; if either the either the transmission or reception of communications data is successful, the value on the data set counter 46, decremented by a counter clock is written back to the data-set-count register 43.

Again in the present embodiment, if either the transmission or reception of communications data is not successful, the values of the address counter 45 and the data set counter 46 are not written back to the address register 42 and the data-set-count register 43. Thus, to transmit or receive the same communications data again, it is now sufficient if the communications controller 40 sets once again the address register 42 and the data-set-count register 43 to the values of the address counter 45 and the data set counter 46.

Figure 2:
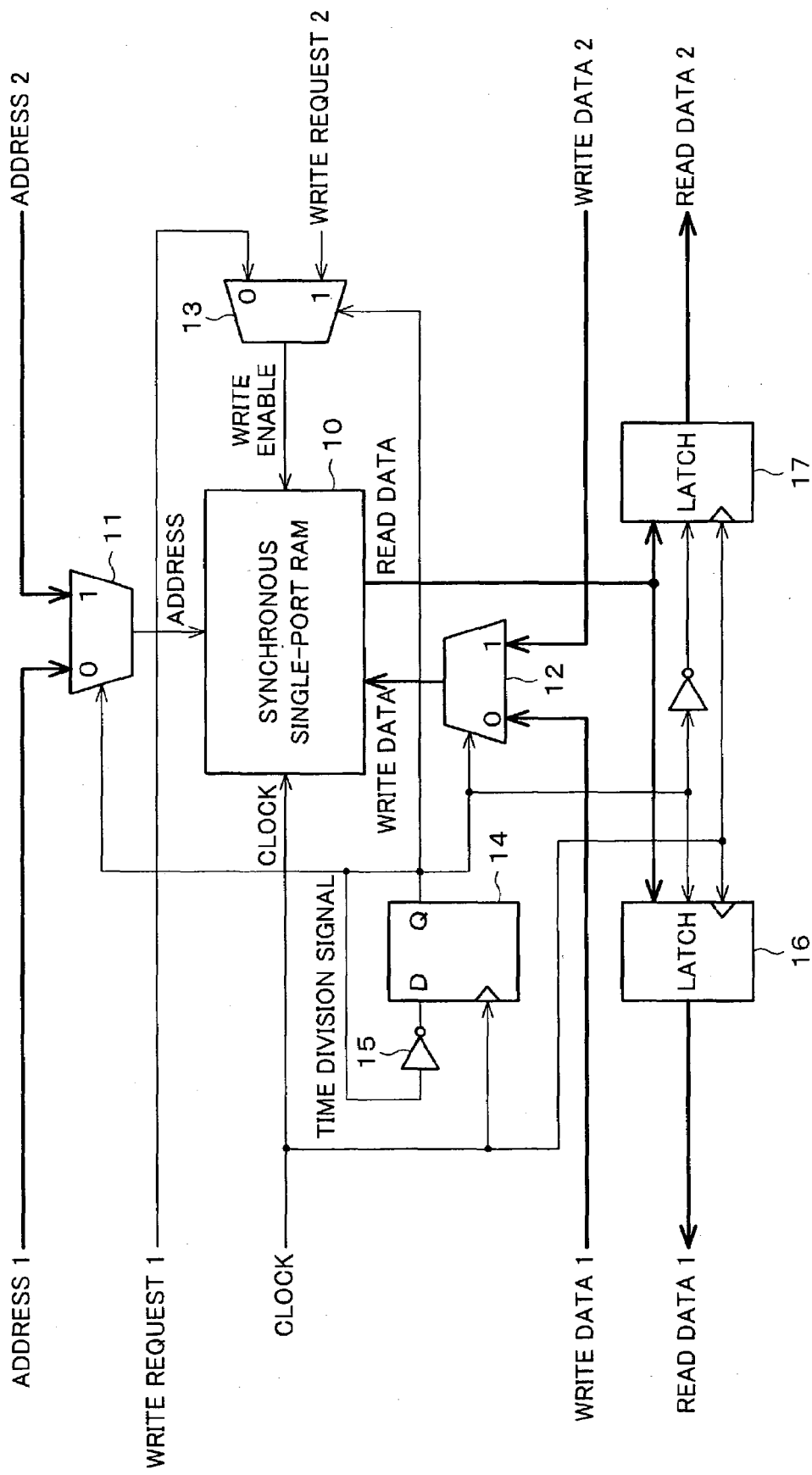
FIG. 2 is a block diagram illustrating an arrangement of a common work RAM, an address register, a data-set-count register, and an information register for use in the communications control unit.

Referring to FIG. 2, an arrangement will be described of the common work RAM (common memory) 41 in the communications control unit shown in FIG. 1.

Common work RAMs, commonly used by the CPU bus side and the communications bus side, which function as a storage of communications data are typically dual-port RAMs. The dual-port RAM is however unsuitable for use in the present embodiment unless it is modified, because it is generally twice as large as a single-port RAM. In addition, registers are typically made of flip-flops, and when containing large numbers of flip-flops, are approximately 8 times as large as a single-port RAM; they are again unsuitable for use in the present embodiment unless modified.

FIG. 2 shows a configuration of the common memory 41 built around a synchronous single-port RAM. The address register 42, data-set-count register 43, and information register 44 are made based on almost the same principles.

The common work RAM 41 includes a synchronous single-port RAM 10, an address selector 11 for addresses, a write data selector 12 for write data, a write request selector 13 for write requests, a frequency divider 14 constituted by flip-flops, an inverter 15 which inverts an output of the frequency divider, a first latch 16, and a second latch 17.

The synchronous single-port RAM 10, in which write data 1 or write data 2 is written at addresses specified by an address 1 or an address 2 in response to a write request 1 or a write request 2, reads data from the address specified by the address 1 or the address 2 for output through a first latch or a second latch.

The address selector 11 is means to select and output the address 1 and the address 2 alternately in accordance with an output from the frequency divider.

The write data selector 12 is means to select and output the write data 1 and the write data 2 alternately in accordance with an output from the frequency divider.

The write request selector 13 is means to select the write request 1 and the write request 2 alternately for a write enable output in accordance with an output from the frequency divider.

The frequency divider 14 is means to divide a counter clock for a time division signal output.

The first latch 16 and the second latch 17 are means to alternately latch data read from the address specified by the address 1 and the address 2 for an output as read data 1 or read data 2.

Figure 3:
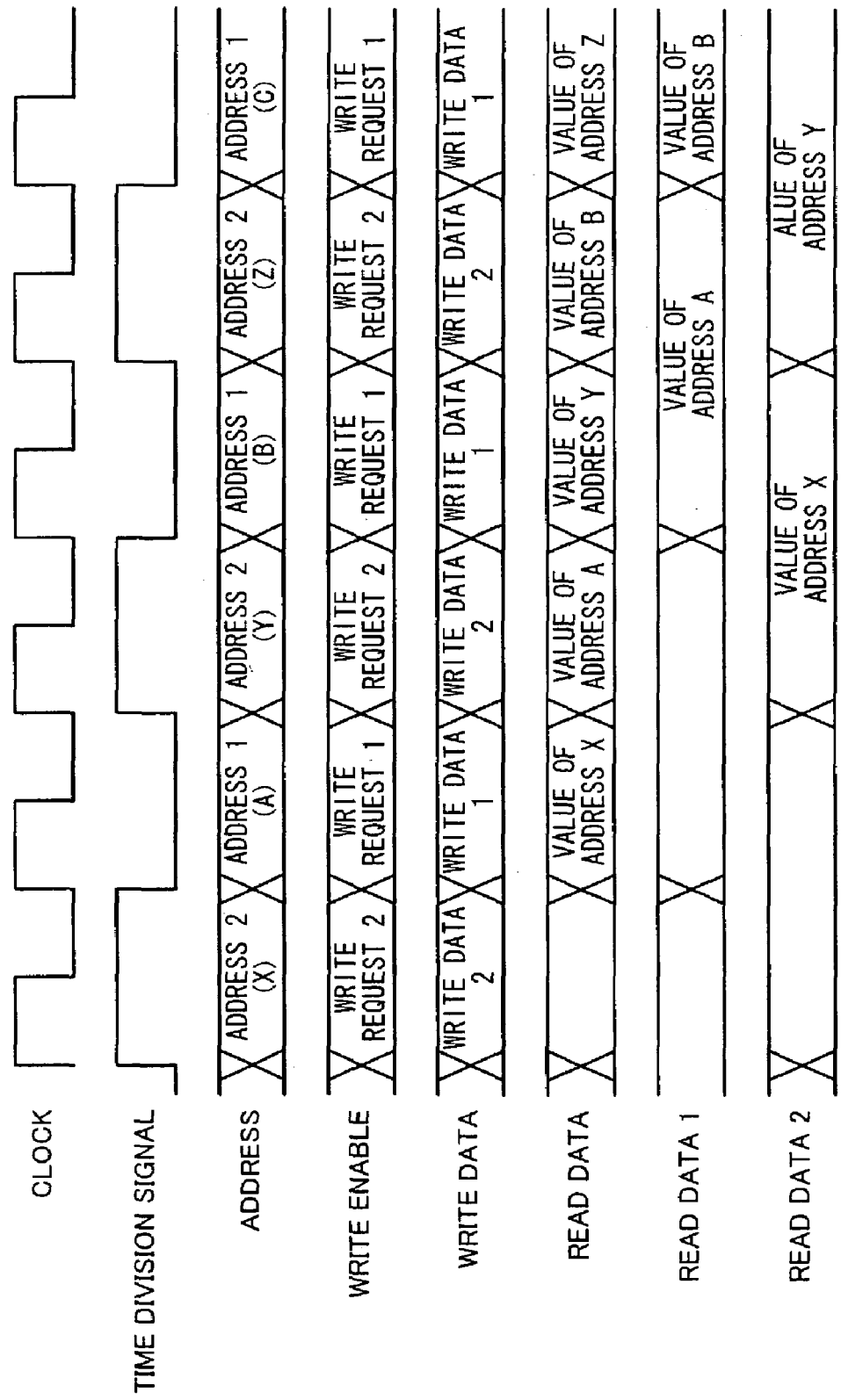
FIG. 3 is a timing chart of the circuit in FIG. 2.
Figure 4:
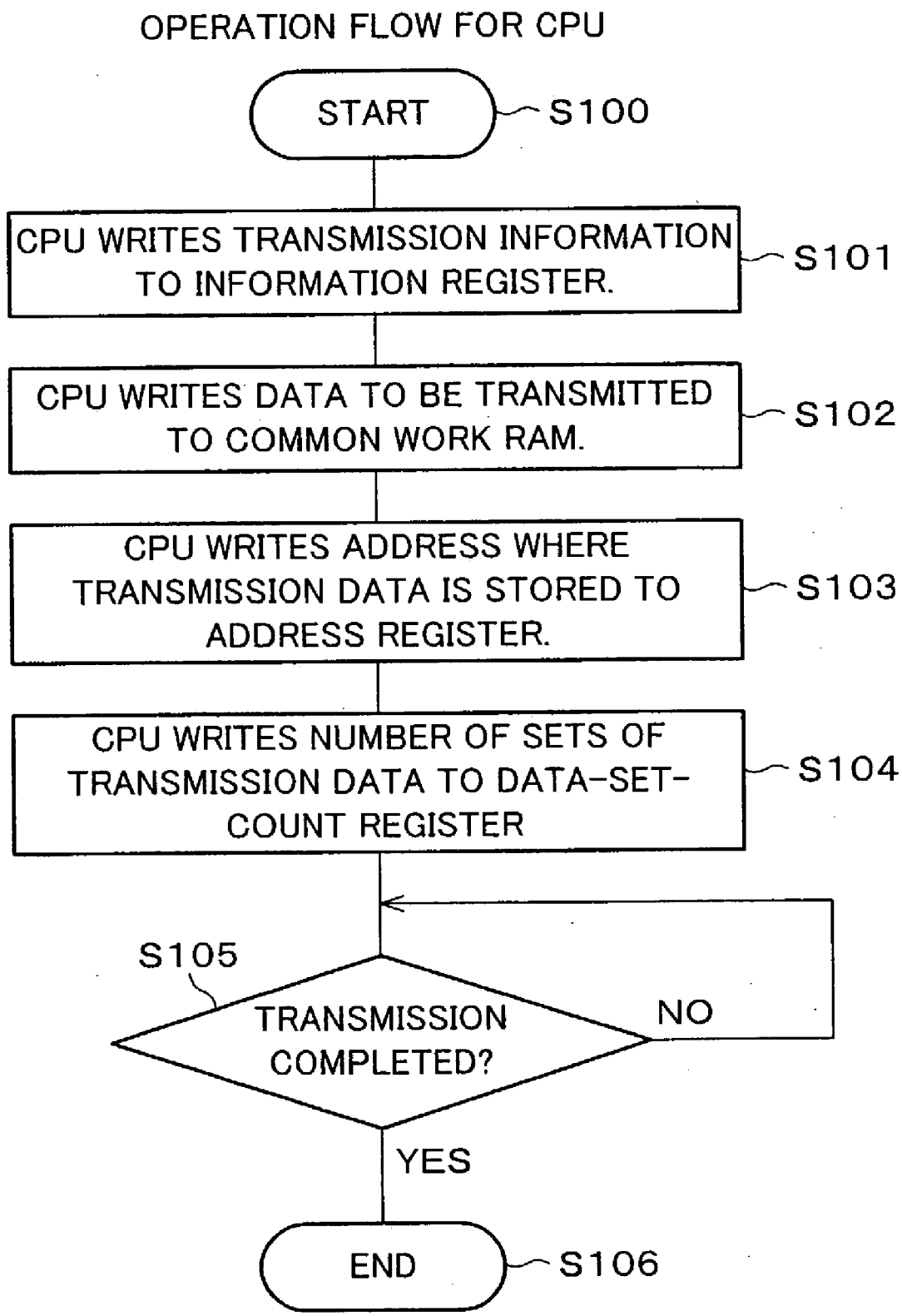
FIG. 4(a) is a flow chart depicting an operation of a CPU in the communications control unit in a transmission process.
FIG. 4(b) is a flow chart depicting an operation of a communications control circuit in the communications control unit in a transmission process.
Figure 5:
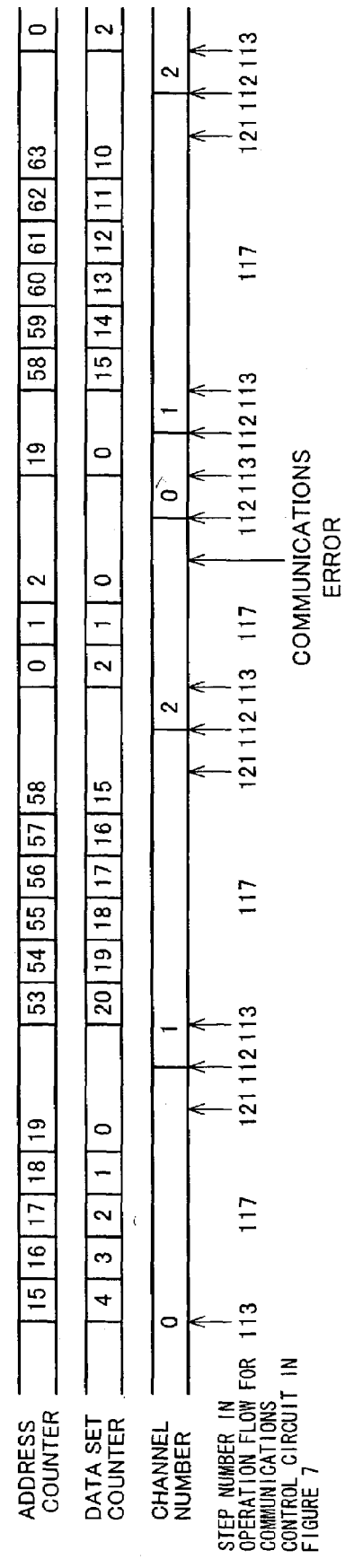
FIG. 5 is an explanatory drawing showing changes in an address register, a data-set-count register, and counters in a transmission process.

Referring to the timing chart in FIG. 3, data writing and reading timings in the common work RAM 41 in FIG. 2 will be described.

A counter clock from the RAM control circuit 49 is supplied to the synchronous single-port RAM 10, the frequency divider 14, the first latch 16, and the second latch 17. The frequency divider 14 outputs a time division signal in accordance with a clock input.

The address (CPU address bus side) 1 and the address (communications bus side communications address) 2 are supplied to the address selector 11, where one of the addresses 1, 2 is alternately selected in accordance with the time division signal and supplied as an address to the synchronous single-port RAM 10.

The write request 1 (CPU data bus side) and the write request (communications bus side) 2 are supplied to the write request selector 13, where one of the write requests, 1, 2 is alternately selected in accordance with the time division signal and supplied as a write enable to the synchronous single-port RAM 10.

The write data 1 and the write data 2 are supplied to the write data selector 12, where one of the write data 1, 2 is alternately selected in accordance with a time division signal and supplied as write data to the synchronous single-port RAM 10.

Read data is read from the synchronous single-port RAM 10 in accordance with a time division signal and supplied to the first latch 16 and the second latch 17.

The first latch 16 and the second latch 17 alternately output the incoming read data as the read data 1 from the first latch 16 and as the read data 2 from the second latch 17 in accordance with a time division signal.

With the counter clock provided to the frequency divider 14 and the inverter 15 connected to the D input thereof, the time division signal switches between 0 and 1 every time the clock rises. This causes the switching of the address selector 11, the write data selector 12, and the write request selector 13, selecting the address 1, the write data 1, and the write request 1 when the time division signal is "0" and the address 2, the write data 2, and the write request 2 when the time division signal is "1."

The signals thus selected are supplied to the synchronous single-port RAM 10, where they are written or read at rises of the clock.

The read data, or a readout value, is held by the first latch 16 at rises of the clock when the time division signal is "1" and by the second latch 17 at rises of the clock when the time division signal is "0."

The arrangement hence allows the two individual circuits to access the synchronous single-port RAM 10. The address register 42, the data-set-count register 43, and the information register 44 operate based on almost the same principles.

Operation procedures will be described for the case that the communications control unit transmits communications data (transmission data) in reference to the flow charts in FIG. 4(a) and FIG. 4(b). In addition, an example will be given depicting changes of the address register 42, the data-set-count register 43, etc. during the procedures, in reference to FIG. 5.

Assume in this example that initially, the channel "0" has an address "15" and four sets of data, the channel "1" has an address "53" and twenty sets of data, and the channel "2" has an address "0" and two sets of data. Assume also that the information register 44 is holding a channel number "0."

Referring to FIG. 4(a), at the start of a transmission (step 100), the CPU 1 writes, for example, the communications speed, type, validity, and other information on the channel "0" to the information register 44 (step 101).

The CPU 1 writes communications data (transmission data) to a predetermined address in the common work RAM 41 (step 102), writes the address in the common work RAM 41 where the transmission data to the address register 42 is held (step 103), and writes the number of sets of the transmission data to the data-set-count register 43 (step 104).

The CPU 1 monitors whether the transmission data has been transmitted (step 105), and upon transmission, ends the transmission process (step 106).

Meanwhile, as shown in FIG. 4(b), the communications controller 40 in the communications control circuit 4 reads transmission information on the channel "0" specified by the CPU 1 from information register 44 and the number of sets of the data from the data-set-count register 43 (step 110).

The communications controller 40 checks with the data-set-count register 43, the information register 44, etc. to determine whether they are ready for transmission (step 111).

Upon determining that they are ready for transmission, the communications controller 40 sets the address counter 45 to the value "15" on the address register 42 and the data set counter 46 to the value "4" on the data-set-count register 43 (step 113).

The communications controller 40 instructs the transmission circuit 48 to start to transmit the transmission data (step 114). The transmission circuit 48 sends the RAM control circuit 49 a transmission data transfer request (transmission data request) by which transfer of the transmission data is requested (step 115).

The RAM control circuit 49 reads the transmission data from the address "15" in the common work RAM 41 as provided by the address counter 45, and transfers the data to the transmission circuit 48 to write the data. Thereafter, the RAM control circuit 49 outputs a counter clock (step 116).

Upon successful transfer of the transmission data, the RAM control circuit 49 supplies a counter clock to the address counter 45 which is incremented by 1 to "16" and also to the data set counter 46 which is decremented by 1 to "3" (step 117).

The transmission circuit 48 sends the transmission data to the communications bus.

The communications controller 40 refers to the data set counter 46 to see if the number of sets of data has become "0," and further determines if the transmission data is to be transmitted (step 118).

If the data set counter 46 is not showing a value "0," the operation returns to step 115, whereupon a transmission process is carried out for a next set of communications data.

The transmission process (step 115 to step 118) for the transmission data is repeated until there is no more transmission data (until the data set counter 46 shows a 0 value). If the data set counter 46 is showing "0" in step 118, the communications controller 40 determines that the transmission data has been completely transmitted and receives a handshake (respond) from a communications control circuit involved in the communications (step 119) to determine whether the transmission has been successful (step 120).

If the transmission of the transmission data has been successful, the communications controller 40 writes the value "19" on the address counter 45 and the value "0" on the data set counter 46 back to the address register 42 and the data-set-count register 43 respectively (step 121), and thereafter increments the channel number (step 112). The operation then returns to step 110, where the communications controller 40 carries out a transmission process for the transmission data for a next channel "1." The address counters 45, 46 are endless counters.

For the channel number "1," the address counter 45 is set to an address "53," and the data set counter 46 is set to a number of sets of data "20" (step 113). Following step 114, steps 115 to 118 are repeated, and assuming that the channel "1" has a maximum packet length of "5," the transmission circuit 48 ends the transmission upon the transmission of 5 sets of data. When "5" sets of transmission data has been transmitted, since the address counter value shows "58," and the data set counter value shows "15," the values are written back to the address register 42 and the data-set-count register 43 respectively in step 121. Thereafter, in step 112, the channel number is incremented as a preparation for a transmission process for a next channel number "2."

For the channel number "2," the address counter 45 is set to an address "0," and the data set counter 46 is set to a number of sets of data "2" (step 113). Following step 114, steps 115 to 118 are repeated.

If it is determined in step 120 that the transmission has not been successful, the operation returns to step 112, whereupon the channel number is incremented to carry out a data transmission process for a next channel number "0" (step 110).

The communications data for the channel number "0" was already transmitted, it is determined that preparation is yet to be complete (step 111), and the channel number is incremented (step 112) to carry out a data transmission process for a next channel number "1" (step 110).

For the channel number "1," the address counter 45 is set to an address "58," and the data set counter 46 is set to a number of sets of data "15" (step 113). Following step 114, step 115 to 118 are repeated, and the transmission is ended upon the transmission of the maximum packet length of "5" for the channel "1." If the 5 sets of data has been successfully transmitted, since the address counter value shows "63," and the data set counter value shows "10," the values are written back to the address register 42 and the data-set-count register 43 in step 121. Thereafter, in step 112, the channel number is incremented as a preparation for a transmission process for a next channel number "2."

For the channel number "2," since the previous communications data transmission was not successful, the values on the address counter 45 and the data set counter 46 remain as they were initially set: the address counter 45 shows an address "0" and the data set counter 46 shows a number of sets of data "2 " (step 113).

After step 114, steps 115 to 118 are repeated. If the communications data transmission has been successful, since the address counter 45 is showing a value "2 ," and the data set counter 46 is showing a value "0," the values are written back to the address register 42 and the data-set-count register 43 respectively.

Now, referring to the flow charts in FIG. 6(a) and FIG. 6(b), operation procedures will be described for the case that the communications control unit receives communications data.

As shown in FIG. 6(a), at the start of a reception (step 200), the CPU 1 writes the communications speed, type, validity, and other reception information to the information register 44 (step 201).

The CPU 1 writes to the address register 42 an address in the common work RAM 41 where incoming communications data (reception data) will be written (step 202). The CPU 1 writes the number of sets of data which can be received to the data-set-count register 43 (step 203).

The CPU 1 monitors reception of reception data (step 204). Upon acknowledging the reception of the reception data, the CPU 1 reads the reception data from the common work RAM 41 (step 205), thereupon ending the reception process (step 206).

Figure 6:
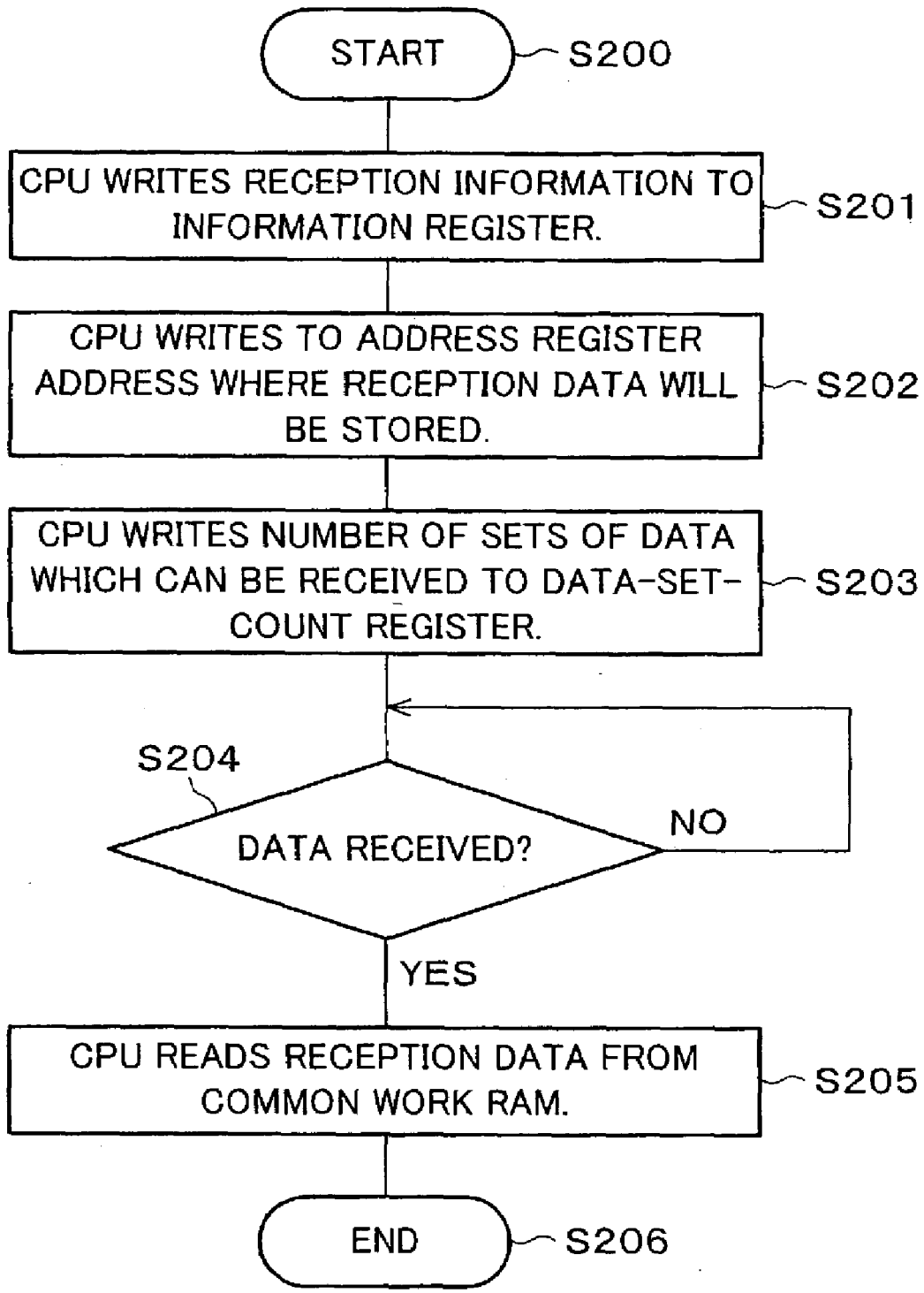
FIG. 6(a) is a flow chart depicting an operation of a CPU in the communications control unit in a reception process.
FIG. 6(b) is a flow chart depicting an operation of a communications control circuit in the communications control unit in a reception process.
Figure 6:
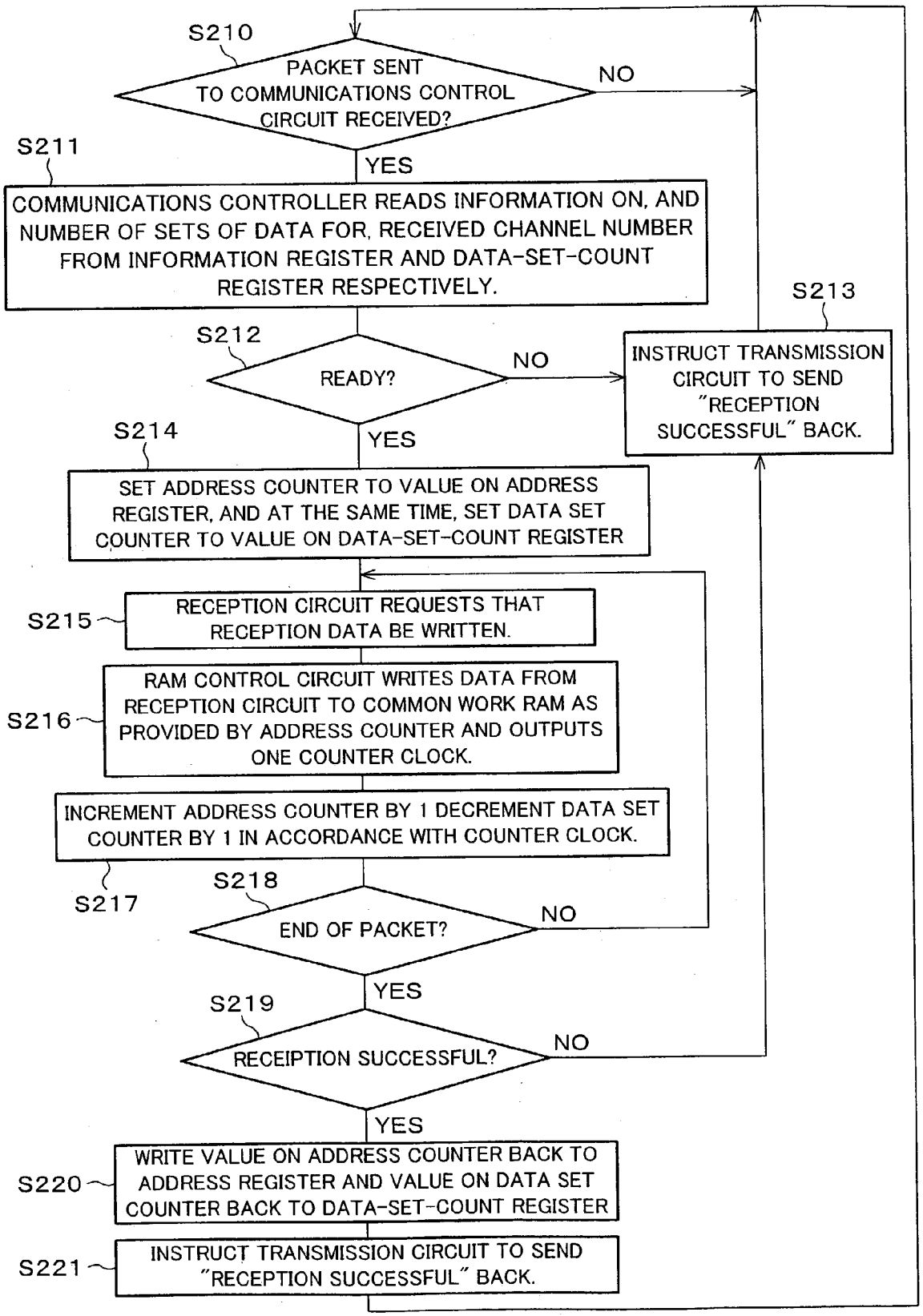
Figure 7:
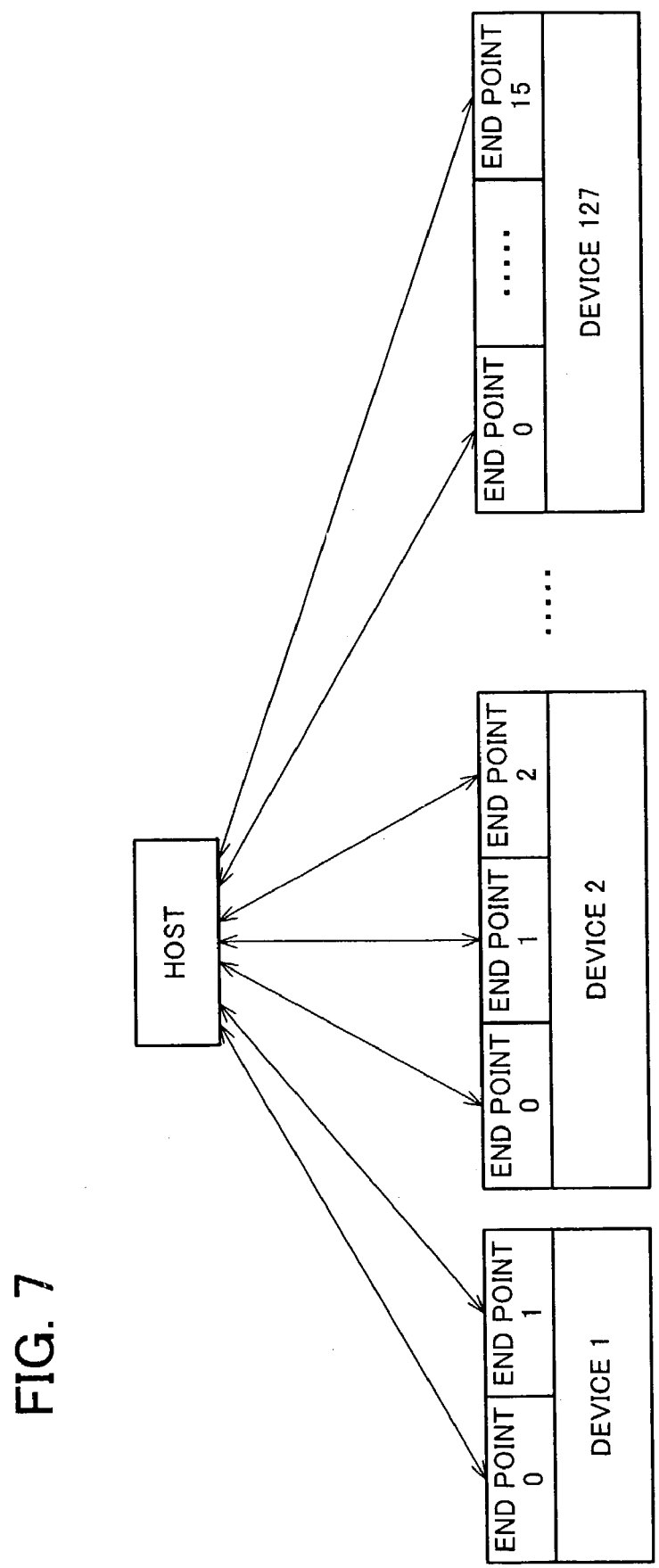
FIG. 7 is an explanatory drawing showing an USB logic bus topology.
Figure 8:
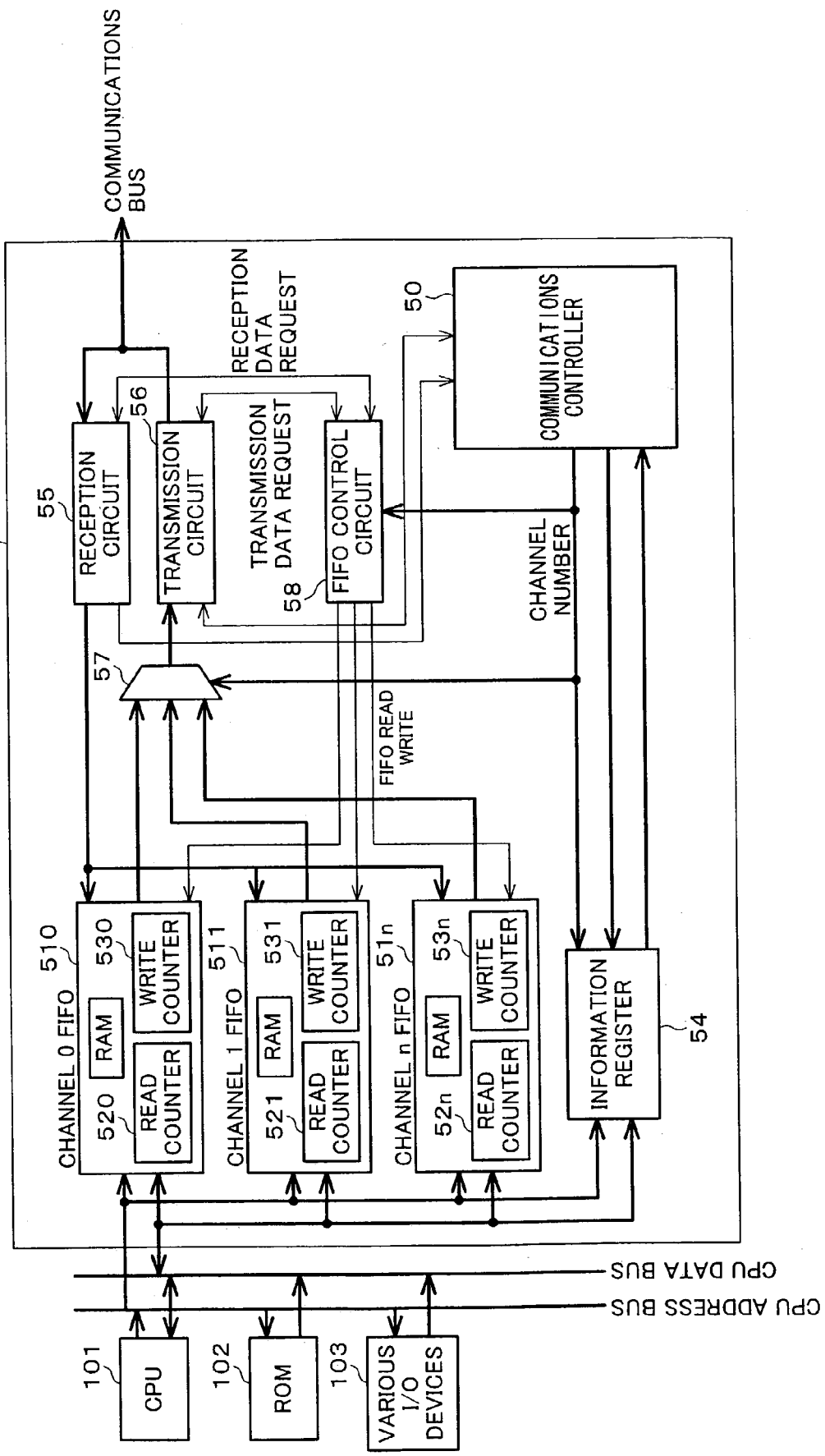
FIG. 8 is a block diagram illustrating an arrangement of a conventional communications control unit.
Figure 9:
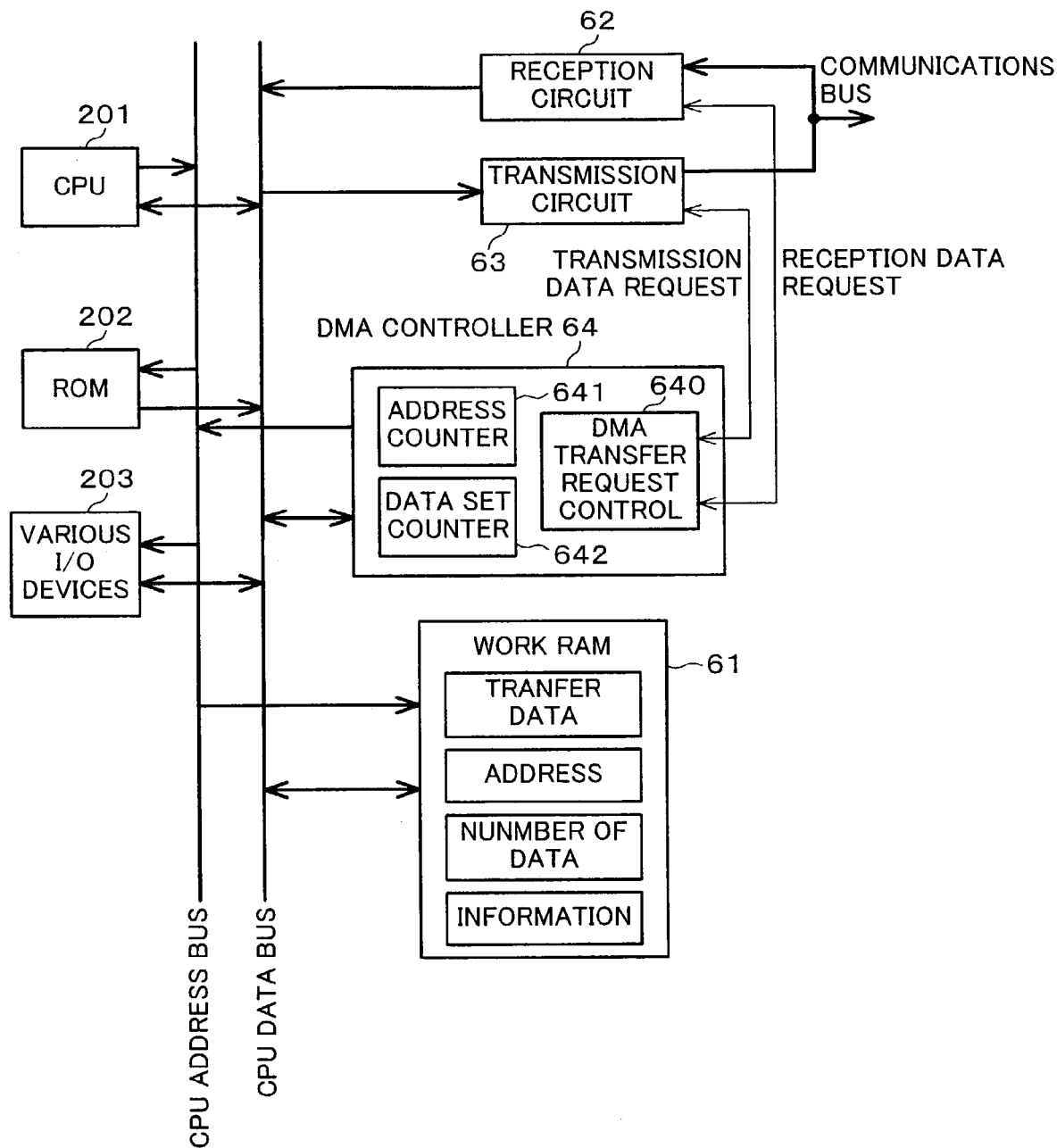
FIG. 9 is a block diagram illustrating an arrangement of another conventional communications control unit.
Figure 10:
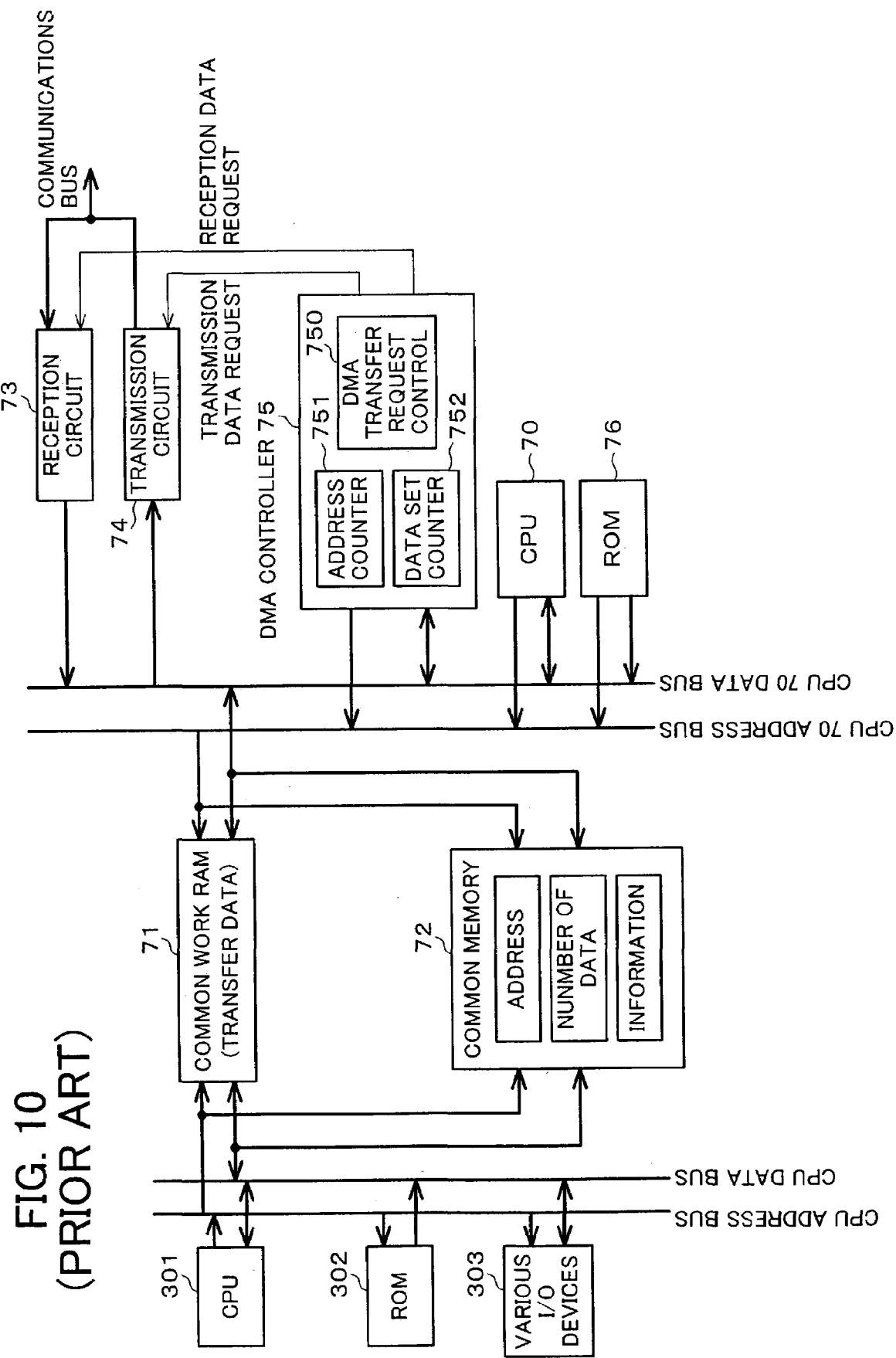
FIG. 10 is a block diagram illustrating an arrangement of still another conventional communications control unit.

Meanwhile, as shown in FIG. 6(*b*), the communications controller 40 for the communications control circuit 4 monitors the reception circuit 47 to check whether it has received a packet sent to the communications control circuit 4 (step 210). As the reception circuit 47 receives a packet sent from the communications bus to the channel "1," the communications controller 40 verifies the channel for the received data, sets the channel number to "1," and reads information on, and the number of sets of data for, the channel number "1" from the information register 44 and the data-set-count register 43 respectively (step 211).

The communications controller 40 checks with the data-set-count register 43 and the information register 44 to determine whether a preparation for reception has been done (step 212). Upon determining that a preparation has been done for a reception, the communications controller 40 sets the address counter 45 to the value on the address register 42 and the data set counter 46 to the value on the data-set-count register 43 (step 214).

The reception circuit 47 notifies the RAM control circuit 49 of a reception data transfer request (reception data request) by which writing of the reception data to the common work RAM 41 is requested (step 215).

Having received the reception data transfer request, the RAM control circuit 49 writes the reception data from the reception circuit 47 to the address in the common work RAM 41 as provided by the address counter 45. Thereafter, the RAM control circuit 49 outputs a counter clock (step 216).

Upon reception of the counter clock, the address counter 45 is incremented by 1 and the data set counter 46 is decremented by 1 (step 217).

The communications controller 40 determines whether the reception data having been transferred to the common work RAM 41 represents the end of the packet (step 218). If it does, it is determined whether the reception data has been successfully received (S219). If the reception has been successful, the communications controller 40 writes the value on the address counter 45 back to the address register 42 and the value on the data set counter 46 back to the data-set-count register 43 (step 220).

The communications control circuit 4 instructs the transmission circuit 48 to send "Reception Successful" back to the communications control unit involved in the communications (step 221) and returns to step 210 to prepare for a reception of a next set of communications data.

If the channel under consideration is not ready for a reception in step 212, the communications controller 40 instructs the transmission circuit 48 to send "Reception Successful" back to the communications control unit involved in the communications (step 213).

If the transfer of the reception data to the common work RAM 41 leaves more packet(s) to be transferred in step 218, the operation returns to step 215, whereupon a reception process for a next set of reception data is carried out.

If the reception of the communications data is not successful in step 219, the communications control circuit 4 instructs the transmission circuit 48 to send "Reception Failed" to the communications control unit involved in the communications (step 213), and returns to step 210 to prepare for a reception of a next set of communications data.

As described in the foregoing, in the present embodiment, when there has occurred an error during a transmission, the value on the address counter 45 and the value on the data set counter 46 are not written back to the address register 42 and the data-set-count register 43.

Therefore, the communications control circuit 4 can transmit the same communications data again by writing the address and number of sets of data held in the address register 42 and the data-set-count register 43 to the address counter 45 and the data set counter 46 respectively.

Similarly, when there has occurred an errors during a reception, the value on the address counter 45 and the value on the data set counter 46 are not likewise written back to the address register 42 and the data-set-count register 43. Therefore, the communications control circuit 4 can receive the same communications data again by writing the address and number of sets of data held in the address register 42 and the data-set-count register 43 to the address counter 45 and the data set counter 46 respectively.

According to the present embodiment, when there has occurred an error, the communications control circuit 4 automatically carries out the communications again based on the data held in the address register 42, the data-set-count register 43, and the information register 44; the CPU 1 therefore does not have to do anything.

As described in the foregoing, with the transmission control circuit, the reception control circuit, the communications control circuit, and the communications control unit in accordance with the present invention, communications data is stored in a common work RAM shared for use between a CPU-connected CPU bus and a communications control circuit, and the addresses and number of sets of data, as well as other information, are stored another common memories (address register, data-set-count register, information register) shared for between the CPU-connected CPU bus and the communications control circuit. Further, an address-holding common memory (address register) is connected to an address counter, a data-set-count-holding common memory (data-set-count register) is connected to a data set counter, and a common memory (information register) holding various information is connected to a communications controller, so that the addresses and number of sets of data, and other information can be specified and updated at once. Thus, high speed communications is achieved with least possible circuit complexity.

Further, a transmission control circuit in accordance with the present invention is a transmission control circuit connected to a CPU through a data bus and an address bus, and also to a communications bus, and includes:

a common memory for storing transmission data in accordance with a command from the CPU;

a transmission circuit for transmitting the transmission data transferred from the common memory to the communications bus;

an address register which specifies an address in the common memory where the transmission data is held;

a data-set-count register which specifies a number of sets of the transmission data stored in the common memory;

an information register which specifies communications speed, type, validity, and other information;

an address counter which is set to the address held in the address register and which is incremented by a counter clock;

a data set counter which is set to a value of the number of sets of data held in the data-set-count register and which is decremented by a counter clock;

a RAM control circuit for reading the transmission data from the address in the common memory as provided by the address counter in accordance with a transmission data transfer request from the transmission circuit, transferring the transmission data to the transmission circuit, and generating the counter clock; and a communications controller for reading values from the data-set-count register, the information register, etc. to determine whether a preparation has been done for a transmission, and if a preparation has been done for a transmission, setting the address counter to the address on the address register and the data set counter to a value of the number of sets of data on the data-set-count register and instructing the transmission circuit to start the transmission, and if the transmission has been successful, writing the value on the address counter back to the address register and the value on the data set counter back to the data-set-count register.

Further, a reception control circuit in accordance with the present invention connected to a CPU and a communications bus, includes:

a common memory for storing reception data;

a reception circuit for transferring reception data received from the communications bus to the common memory;

an address register which specifies an address in the common memory where the reception data is held;

a data-set-count register which specifies a number of sets of the reception data stored in the common memory;

an information register which specifies communications speed, type, validity, and other information;

an address counter which is set to the address held in the address register and which is incremented by a counter clock;

a data set counter which is set to a value of the number of sets of data held in the data-set-count register and which is decremented by a counter clock;

a RAM control circuit for transferring the reception data to the common memory and writing the reception data at an address as provided by the address counter in accordance with a reception data transfer request from the reception circuit, and generating a counter clock; and a communications controller for reading values from the data-set-count register, the information register, etc., to determine whether a preparation has been done for a reception, and if a preparation has been done for a reception, setting the address counter to the address on the address register and the data set counter to a value of the number of sets of data on the data-set-count register and instructing the reception circuit to start to transfer the reception data, and if the reception has been successful, writing the value on the address counter back to the address register and the value on the data set counter back to the data-set-count register.

Further, a communications control circuit in accordance with the present invention connected to a CPU through a data bus and an address bus, and also to a communications bus;

a common memory for storing communications data;

a transmission circuit for transmitting the communications data transferred from the common memory to the communications bus;

a reception circuit for transferring the communications data received from the communications bus to the common memory;

an address register which specifies an address in the common memory where the communications data is held;

a data-set-count register which specifies a number of sets of the communications data stored in the common memory;

an information register which specifies communications speed, type, validity, and other information;

an address counter which specifies an address in the address register and which is incremented by a counter clock;

a data set counter which specifies a value of the number of sets of data in the data-set-count register and which is decremented by a counter clock;

a RAM control circuit for, in transmission, reading transmission data from an address in the common memory as provided by the address counter and transferring the transmission data to the transmission circuit in accordance with a transmission data transfer request from the transmission circuit, and generating a counter clock, and in reception, transferring reception data to the common memory and writing the reception data to an address as provided by the address counter in accordance with a reception data transfer request from the reception circuit, and generating a counter clock; and a communications controller for reading values from the data-set-count register, the information register, etc., to determine whether a preparation has been done for a transmission or reception, and if a preparation has been done for a transmission, setting the address counter to the address on the address register and the data set counter to the value of the number of sets of data on the data-set-count register and instructing the transmission circuit to start to transmit the data, and if the transmission has been successful, writing the value on the address counter back to the address register and the value on the data set counter back to the data-set-count register, and if a preparation has been done for a reception, setting the address counter to the address on the address register and the data set counter to the value on the data-set-count register and instructing the reception circuit to start to transfer the reception data, and if the reception has been successful, writing the value on the address counter back to the address register and the value on the data set counter back to the data-set-count register.

Therefore, it is only once that the CPU has to specify and update the address in the common work RAM where the communications data is stored, the number of sets of the communications data, and other information related to communications, so as to deal with an error in subsequent communications processes and achieve high speed communications.

Besides, according to the present invention, the address counter, the data set counter, the data-storing memory, among others are shared for use between communications channels; therefore, a communications control circuit can be constructed with least possible circuit complexity. In addition, a function can be easily realized which is capable of, when there has occurred a communications error, transmit/receive the same data again.

A transmission control circuit, reception control circuit, communications control circuit, and communications control unit connected to a CPU and a communications bus in accordance with the present invention is such that the address information memory means includes registers, and the address specification means includes address counters in which the address data to be set is incremented.

Thus, a transmission control circuit, reception control circuit, communications control circuit, and communications control unit can be offered which is capable of carrying out communications once again with least possible circuit complexity.

A transmission control circuit, reception control circuit, communications control circuit, and communications control unit in accordance with the present invention is such that the common memory includes: a synchronous single-port RAM; an address selector for selecting one from two different address signals as an input to the synchronous single-port RAM; a write request selector for selecting one from two different write request signals as an input to the synchronous single-port RAM; a write data selector for selecting one from two different write data signals as an input to the synchronous single-port RAM; two pairs of latch circuits for holding read data for the synchronous single-port RAM; and a frequency divider circuit for frequency-dividing a counter clock, the selectors, the latches, etc. being switched in response to a selection signal generated by frequency-dividing the counter clock.

Thereby, specific means is offered for a common memory.

The embodiments and examples described in Detailed Description of the Present Invention are for illustrative purposes only and by no means limit the scope of the present invention. Variations are not to be regarded as a departure from the spirit and scope of the invention, and all such modifications as would be obvious to one skilled in the art are intended to be included within the scope of the claims below.

What is claimed is:

1. A transmission control circuit connected to a CPU and a communications bus, comprising:
    transmission data memory means for storing transmission data in segments in accordance with a command from the CPU;
    address information memory means for storing at least address information on the transmission data;
    transmission means for transmitting the transmission data to the communications bus;
    address setting means for sequentially storing address data for the transmission data in accordance with the address information; and
    communications control means for carrying out such a control that the transmission data is transmitted in groups of segments to the communications bus through the transmission means in accordance with the address data, wherein
    the address data stored in the address setting means is updated after each segment is transmitted,
    after each group of segments has been transmitted, if the transmission data has been successfully transmitted, the address information is updated by the address setting means according to the address data, and if the transmission data has not been successfully transmitted, the address information remains unchanged, and
    at least one group of segments includes two or more segments.

2. The transmission control circuit as set forth in claim 1, wherein
    the address information memory means includes registers, and the address setting means includes address counters in which the address data to be set is incremented.

3. A transmission control circuit connected to a CPU through a data bus and an address bus, and also to a communications bus, comprising:
    a common memory for storing transmission data in accordance with a command from the CPU;
    a transmission circuit for transmitting the transmission data transferred from the common memory to the communications bus;
    an address register which specifies an address in the common memory where the transmission data is held;
    a data-set-count register which specifies a number of sets of the transmission data stored in the common memory;
    an information register which specifies at least communications speed, type and validity;
    an address counter which is set to the address held in the address register and which is incremented by a counter clock;
    a data set counter which is set to a value of the number of sets of data held in the data-set-count register and which is decremented by a counter clock;
    a RAM control circuit for reading the transmission data from the address in the common memory as provided by the address counter in accordance with a transmission data transfer request from the transmission circuit, transferring the transmission data to the transmission circuit, and generating the counter clock; and
    a communications controller for reading values from at least one of the data-set-count register and the information register, to determine whether a preparation has been done for a transmission, and if a preparation has been done for a transmission, setting the address counter to the address on the address register and the data set counter to a value of the number of sets of data on the data-set-count register and instructing the transmission circuit to start the transmission, and if the transmission has been successful, writing the value on the address counter to the address register and the value on the data set counter to the data-set-count register, wherein
    the sets of data are transmitted in groups, and the RAM control circuit generates the counter clock after each set of data is transmitted,
    the value of the address counter is written to the address register after successful transmission of each group of sets of data, and the value of the data set counter is written to the data-set-count register after successful transmission of each group of sets of data, and
    at least one of the groups of sets of data includes two or more sets of data.

4. The transmission control circuit as set forth in claim 3, wherein
    the common memory includes: a synchronous single-port RAM; an address signal selector for selecting one from two different address signals as an input to the synchronous single-port RAM; a write request selector for selecting one from two different write request signals as an input to the synchronous single-port RAM; a write data selector for selecting one from two different write data signals as an input to the synchronous single-port RAM; two pairs of latch circuits for holding read data for the synchronous single-port RAM; and a frequency divider circuit for frequency-dividing a counter clock, at least the selectors and the latches being switched in response to a selection signal generated by frequency-dividing the counter clock.

5. A reception control circuit connected to a CPU and a communications bus, comprising:
    reception data memory means for storing reception data;
    reception means for sequentially transferring the reception data received from the communications bus to store the reception data in the reception data memory means;
    address information memory means for storing at least address information on the reception data in accordance with a command from the CPU;
    address setting means for sequentially storing address data according to which the reception data is stored in the reception data memory means, in accordance with the address information; and
    communications control means for carrying out such a control that the reception data is sequentially transferred in groups of segments through the reception means and stored at an address in the reception data memory means according to the address data, wherein the address data stored in the address setting means is updated after each segment is transferred, after each group of segments has been transferred, if the reception data has been successfully received and transferred, the address information is updated by the address setting means according to the address data, and if the reception data has not been successfully received or transferred, the address information remains unchanged, and at least one group of segments includes two or more segments.

6. The reception control circuit as set forth in claim 5, wherein the address information memory means includes registers, and the address setting means includes address counters in which the address data to be set is incremented.

7. A reception control circuit connected to a CPU through a data bus and an address bus, and also to a communications bus, comprising:

a common memory for storing reception data;

a reception circuit for transferring reception data received from the communications bus to the common memory;

an address register which specifies an address in the common memory where the reception data is held;

a data-set-count register which specifies a number of sets of the reception data stored in the common memory;

an information register which specifies at least communications speed, type, and validity;

an address counter which is set to the address held in the address register and which is incremented by a counter clock;

a data set counter which is set to a value of the number of sets of data held in the data-set-count register and which is decremented by a counter clock;

a RAM control circuit for transferring the reception data to the common memory and writing the reception data at an address as provided by the address counter in accordance with a reception data transfer request from the reception circuit, and generating a counter clock; and a communications controller for reading values from at least one of the data-set-count register and the information register to determine whether a preparation has been done for a reception, and if a preparation has been done for a reception, setting the address counter to the address on the address register and the data set counter to a value of the number of sets of data on the data-set-count register and instructing the reception circuit to start to transfer the reception data, and if the reception has been successful, writing the value on the address counter to the address register and the value on the data set counter to the data-set-count register, wherein the sets of data are transferred in groups, and the RAM control circuit generates the counter clock after each set of data is transferred, the value on the address counter is written to the address register after successful transfer of each group of sets of data, and the value on the data set counter is written to the data-set-count register after successful transfer of each group of sets of data, and at least one of the groups of sets of data includes two or more sets of data.

8. The reception control circuit as set forth in claim 7, wherein the common memory includes: a synchronous single-port RAM: an address selector for selecting one from two different address signals as an input to the synchronous single-port RAM; a write request selector for selecting one from two different write request signals as an input to the synchronous single-port RAM; a write data selector for selecting one from two different write data signals as an input to the synchronous single-port RAM; two pairs of latch circuits for holding read data for the synchronous single-port RAM; and a frequency divider circuit for frequency-dividing a counter clock, and at least the selectors and the latches are switched in response to a selection signal generated by frequency-dividing the counter clock.

9. A communications control circuit connected to a CPU and a communications bus, comprising:

communications data memory means for, in transmission, storing transmission data in segments in accordance with a command from the CPU, and in reception, storing reception data;

transmission means for, in transmission, transmitting the transmission data to the communications bus;

reception means for, in reception, sequentially transferring the reception data received from the communications bus so that the reception data is stored in the communications data memory means;

address information memory means for, in transmission, storing at least address information on the transmission data, and in reception, storing at least address information on the reception data in accordance with a command from the CPU;

address setting means for, in transmission, sequentially storing address data for the transmission data in accordance with the address information; and in reception, sequentially storing address data according to which the reception data is stored in the communications data memory means, in accordance with the address information; and communications control means for carrying out such a control that in transmission, the transmission data is transmitted in groups of segments to the communications bus through the transmission means in accordance with the address data, after each segment is transmitted, the address data stored in the address setting means is updated, after each group of segments has been transmitted, if the transmission data has been successfully transmitted, the address information is updated by the address setting means according to the address data, and if the transmission data has not been successfully transmitted, the address information remains unchanged;

and that in reception, the reception data is sequentially transferred through the reception means in groups of segments and stored at an address in the communications data memory means according to the address data, after each segment is transferred, the address data stored in the address setting means is updated, after each group of segments has been transferred, if the reception data has been successfully received and transferred, the address information is updated by the address setting means according to the address data, and if the reception data has not been successfully received or transferred, the address information remains unchanged, and at least one group of segments includes two or more segments.

10. The communications control circuit as set forth in claim 9, wherein
the address information memory means includes registers, and the address setting means includes address counters in which the address data to be set is incremented.

11. A communications control circuit connected to a CPU through a data bus and address bus, and also to a communications bus; comprising:
a common memory for storing communications data;
a transmission circuit for transmitting the communications data transferred from the common memory to the communications bus;
a reception circuit for transferring the communications data received from the communications bus to the common memory;
an address register which specifies an address in the common memory where the communications data is held;
a data-set-count register which specifies a number of sets of the communications data stored in the common memory;
an information register which specifies at least communications speed, type, and validity;
an address counter which specifies an address in the address register and which is incremented by a counter clock;
a data set counter which specifies a value of the number of sets of data in the data-set-count register and which is decremented by a counter clock;
a RAM control circuit for, in transmission, reading transmission data from an address in the common memory as provided by the address counter and transferring the transmission data to the transmission circuit in accordance with a transmission data transfer request from the transmission circuit, and generating a counter clock, and in reception, transferring reception data to the common memory and writing the reception data to an address as provided by the address counter in accordance with a reception data transfer request from the reception circuit, and generating a counter clock; and
a communications controller for reading values from at least one of the data-set-count register and the information register to determine whether a preparation has been done for a transmission or reception, and if a preparation has been done for a transmission, setting the address counter to the address on the address register and the data set counter to the value of the number of sets of data on the data-set-count register and instructing the transmission circuit to start to transmit the data, and if the transmission has been successful, writing the value on the address counter to the address register and the value on the data set counter to the data-set-count register, and if a preparation has been done for a reception, setting the address counter to the address on the address register and the data set counter to the value on the data-set-count register and instructing the reception circuit to start to transfer the reception data, and if the reception has been successful, writing the value on the address counter to the address register and the value on the data set counter to the data-set-count register, wherein
in transmission
the sets of data are transmitted in groups, and the RAM control circuit generates the counter clock after each set of data is transmitted,
the value on the address counter is written to the address register after successful transmission of each group of sets of data, and the value on the data set counter is written to the data-set-count register after successful transmission of each group of sets of data,
in reception
the sets of data are transferred in groups, and the RAM control circuit generates the counter clock after each set of data is transferred,
the value on the address counter is written to the address register after successful transfer of each group of sets of data, and the value on the data set counter is written to the data-set-count register after successful transfer of each group of sets of data, and
at least one of the groups of sets of data includes two or more sets of data.

12. The communications control circuit as set forth in claim 11, wherein
the common memory includes: a synchronous single-port RAM; an address selector for selecting one from two different address signals as an input to the synchronous single-port RAM; a write request selector for selecting one from two different write request signals as an input to the synchronous single-port RAM; a write data selector for selecting one from two different write data signals as an input to the synchronous single-port RAM; two pairs of latch circuits for holding read data for the synchronous single-port RAM; and a frequency divider circuit for frequency-dividing a counter clock, and
at least the selectors and the latches are switched in response to a selection signal generated by frequency-dividing the counter clock.

13. A communications control unit, comprising:
the communications control circuit as set forth in claim 9;
a CPU;
a ROM for storing a program; and
an I/O device.

14. A communications control unit, comprising:
the communications control circuit as set forth in claim 10;
a CPU;
a ROM for storing a program; and
an I/O device.

15. A communications control unit, comprising:
the communications control circuit as set forth in claim 11;
a CPU;
a ROM for storing a program; and
an I/O device.

16. A communications control unit, comprising:
the communications control circuit as set forth in claim 12;
a CPU;
a ROM for storing a program; and
an I/O device.

* * * * *